United States Patent [19]
Jan et al.

[11] Patent Number: 5,657,323
[45] Date of Patent: Aug. 12, 1997

[54] METHOD AND APPARATUS FOR SIGNAL TRANSMISSION IN A COMMUNICATION SYSTEM

[75] Inventors: Yih Guang Jan, Phoenix; Victor Hawes Cutler, Jr., Mesa, both of Ariz.

[73] Assignee: Motorola, Inc., Schaumburg, Ill.

[21] Appl. No.: 506,307

[22] Filed: Jul. 24, 1995

[51] Int. Cl.$^6$ ................................... H04J 3/16
[52] U.S. Cl. ................. 370/252; 370/458; 370/519
[58] Field of Search ........................... 375/200, 203, 375/346, 354, 356, 371; 342/352, 356; 455/12.1, 13.2, 13.4, 51.1, 53.1, 63, 67.1, 67.3, 67.6; 370/252, 442, 458, 503, 516, 517, 519

[56] References Cited

U.S. PATENT DOCUMENTS

| | | | |
|---|---|---|---|
| Re. 32,905 | 4/1989 | Baran | 370/104.1 |
| 4,346,470 | 8/1982 | Alvarez, III et al. | 370/104.1 |
| 4,532,635 | 7/1985 | Mangulis | 455/13.2 |
| 5,440,562 | 8/1995 | Cutler, Jr. | 370/108 |
| 5,463,400 | 10/1995 | Tayloe | 342/352 |

*Primary Examiner*—Alpus H. Hsu
*Attorney, Agent, or Firm*—Sherry J. Whitney

[57] ABSTRACT

A method and apparatus for controlling communication channel allocation in a communication system (10) by obtaining (405) statistical system performance data, determining (415, 420) by a processor (815) an optimum number of sub-time slots (505, 615) and an optimum number of sub-subbands (605), generating (430) available signal transmission units from data describing historical communication traffic, and assigning (435) available signal transmission units by another processor (910) to dynamically control communication traffic.

20 Claims, 5 Drawing Sheets

FIG. 8

METHOD AND APPARATUS FOR SIGNAL TRANSMISSION IN A COMMUNICATION SYSTEM

FIELD OF THE INVENTION

This invention relates generally to signal transmission and, in particular, to methods of implementing communication channel allocation for frequency division multiplexing/time division multiplexing methods of signal access.

BACKGROUND OF THE INVENTION

Communication systems utilizing multiple communication structures are useful in providing multiple telecommunication links across widely dispersed locations. To exploit this benefit, the multiple links must be separated from each other in time and/or frequency. Various methods of multiple access are available to implement the separation of telecommunication links.

In frequency division multiplexing/time division multiplexing methods of signal access, a communication system may be structured to have subbands and time slots. The frequency spectrum is divided into frequency channels where each frequency channel occupies a certain frequency range, and a certain number of frequency channels are combined into a subband. Based on the available frequency subbands and number of time slots implemented in the system, and constraints such as the interference level permitted, the availability of communication channels for assignment to users is limited. As defined herein, the term "reuse unit" is a time slot and subband combination providing an available communication channel to a user.

"Time shift" (or "time slide") is a phenomenon that is created by the propagation path delay of transmission from satellites to other communication structures. Typically, the greater the distance between the satellite and the other communication structure, the greater the time of propagation path delay. When a user is communicating in a satellite communication system, the user may be located in coverage areas of a multiple number of satellites. For example, the user may receive a desired transmission signal in an allotted, receive time slot and additionally receive other signals transmitted from the satellites having the user in their coverage areas in the same allotted, receive time slot. These other signals received by the user are interfering signals and are said to have their signal time shift into the user's allotted receive time slot. The extent of time shift depends on propagation paths between the user and all the other satellites having the user in their coverage areas and depends on the design procedures of assigning time slots in a channel reuse unit allocation.

Another possibility for the occurrence of time shift is due to the generation of interference signals from the assignment of the same frequency channels and time slot location to other users and consequently the realization of frequency subband reuse technology and/or due to system nonlinear operations (e.g., antenna power amplification and frequency conversion) when the signal is transmitting through the system.

Furthermore, in a satellite communication system, for example, the position of the satellites complicates the problem of time shift. For example, as satellites converge, transmission overlap increases and the amount of time required to separate the transmissions may increase. As adjacent-plane satellites diverge, transmission overlap decreases and the amount of time required to separate the transmissions may decrease.

Prior-art methods do not adequately address the problem of time shift. They simply do not allocate reuse units adjacent to the assigned reuse unit for signal transmission in order to compensate for the time shift. The time slots of the reuse units adjacent to the assigned reuse unit are inefficiently used. Typically, the prior-art methods increase the delay time of signal transmissions to account for time shift. In addition, the prior-art methods do not address the problem of varying degrees of time shift.

When the system traffic is heavy, a reuse unit may endure different levels of interference within the duration of the reuse unit because of the realization of frequency subband reuse technology and/or due to system nonlinear operations. As a result, the user encounters different levels of communication quality, for example. The system performance is not guaranteed uniformly in the full reuse unit time duration. The prior-art methods do not address the problem of providing uniform communication quality.

What are needed are a method and apparatus for signal transmission that maximize communication channel assignment to efficiently minimize the degree of unused time duration of signal transmissions. Further needed are a method and apparatus for signal transmission that flexibly and dynamically accommodate various degrees of potentially overlapping transmission due to varying satellite locations. Further needed are a method and apparatus to provide uniform signal transmission during a user's access to the communication system.

DETAILED DESCRIPTION OF THE DRAWINGS

The method and apparatus of the present invention maximize channel assignment by efficiently minimizing the degree of unused time duration of signal transmissions. The method and apparatus of the present invention also flexibly and dynamically accommodate various degrees of potentially overlapping transmission due to varying satellite locations. In addition, the method and apparatus of the present invention provide uniform signal transmission during a user's access to the communication system.

While the present invention is described in the context of a satellite system, the present invention is not intended to be limited to satellite systems and may be applied to systems having multiple communication structures. Further, while the method and apparatus of the present invention are described for a constellation of low-Earth orbiting satellites, this is merely for convenience of explanation and not intended to be limiting. The present invention applies to any system having at least two satellites that move relative to each other and whose antenna footprints have varying overlap. This may include a combination of geostationary satellites and satellites that move relative to the surface of the Earth.

A "satellite" is defined herein to mean a man-made object or vehicle that orbits a celestial body (e.g., Earth). A "constellation" is defined herein to mean an ensemble of satellites arranged in orbits for providing specified coverage (e.g., radio communication, photogrammetry, etc.) of portion(s) or all of the celestial body. A constellation may include multiple rings (or orbital planes) of satellites and may have equal numbers of satellites in each plane, although this is not essential.

The term "terrestrial" is defined herein to mean on or near the surface of a celestial body such as the Earth. A "terrestrial station" is defined herein to mean a communication device on the surface of the Earth whose location is known.

As used herein the terms "cell" and "antenna pattern" are not intended to be limited to any particular mode of generation such as generation by way of satellite transmission. For convenience of explanation, generation of cell and antenna pattern include those created by either terrestrial or satellite cellular communications systems and/or combinations thereof.

Figure 1:
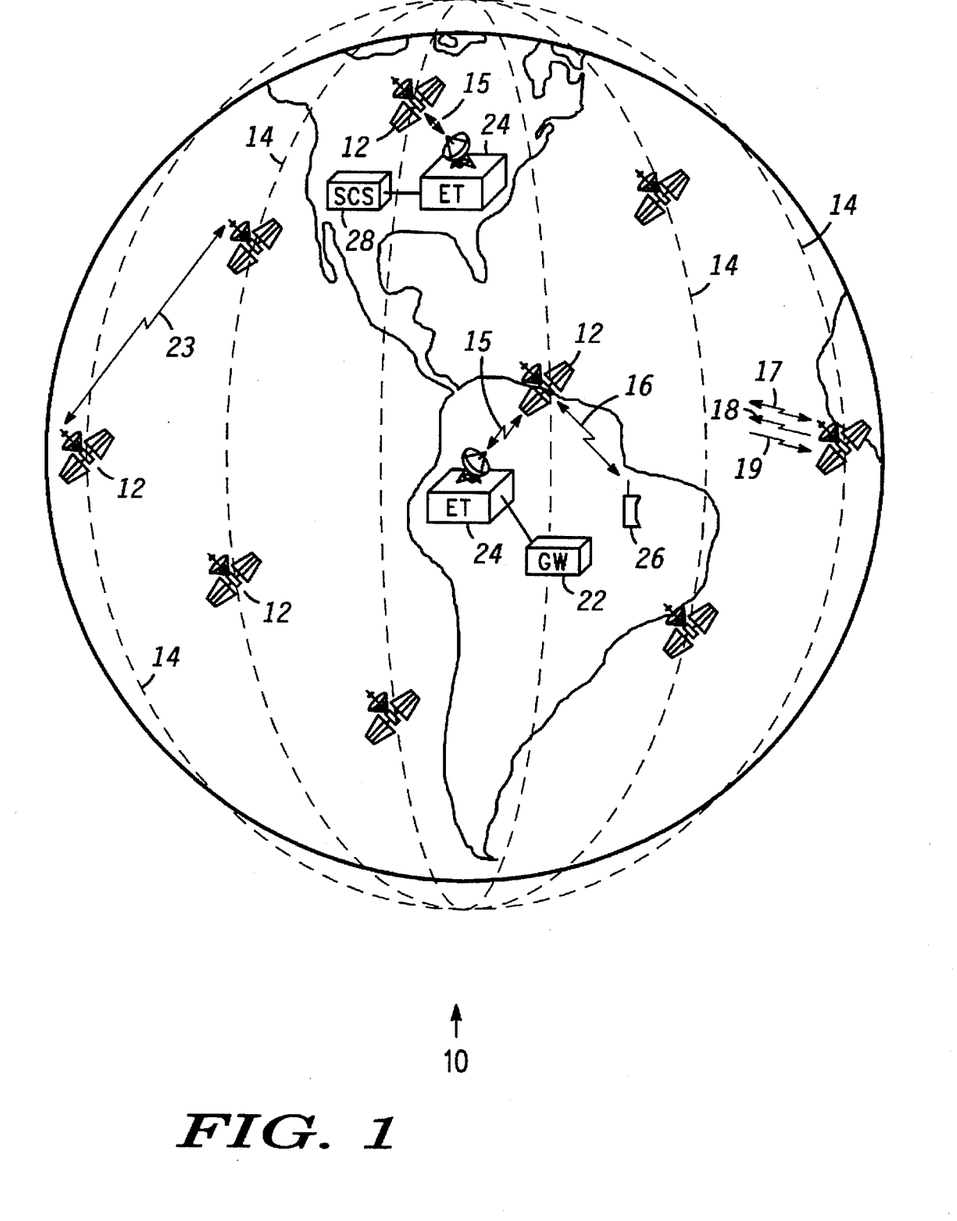
FIG. 1 shows a layout diagram of a satellite-based cellular communication system in accordance with a preferred embodiment of the present invention.

FIG. 1 shows a layout diagram of a satellite-based cellular communication system in accordance with a preferred embodiment of the present invention. Communication system 10 is dispersed over and surrounding a celestial body (e.g., Earth) through use of orbiting satellites 12 occupying orbits 14. The method and apparatus of the present invention are applicable to systems including satellites having low-Earth, medium-Earth, and geo-synchronous orbits. Additionally, they are applicable to orbits having any angle of inclination (e.g., polar, equatorial or other orbital pattern) and are applicable to terrestrial based communication systems.

Communication system 10 uses six polar orbits 14, with each orbit 14 holding eleven satellites 12 for a total of sixty-six satellites 12. However, this is not essential and more or fewer satellites, or more or fewer orbits, may be used. While the method and apparatus of the present invention are advantageously employed when a large number of satellites are being used, they are also applicable with as few as two satellites. For clarity, FIG. 1 illustrates only a few of the satellites 12 in the constellation.

Each orbit 14 of communication system 10 desirably encircles Earth at an altitude of around 780 km, although higher or lower orbital altitudes, geosynchronous orbits, or a combination thereof may be usefully employed. Due to the relatively low orbits of satellites 12, substantially line-of-sight electromagnetic transmission (e.g., radio or light) from any one satellite 12 or reception of signals by any one satellite 12 involves or covers a relatively small area of Earth at any instant.

For the example shown, satellites 12 travel with respect to Earth at around 25,000 km/hr, allowing satellite 12 to be visible to a terrestrial station for a maximum period of approximately nine minutes.

Satellites 12 communicate with terrestrial stations which may include any number of radio communication subscriber units (SUs) 26 and Earth terminals (ETs) 24. System control segment (SCS) 28 may be connected to ETs 24. Gateways (GWs) 22 may also be connected to ETs 24, which provide access to the public switched telephone network (PSTN) (not shown) or other communications facilities. Only one each of GWs 22, SCS 28 and SUs 26 are shown in FIG. 1 for clarity and ease of understanding. ETs 24 may be co-located with or separate from SCS 28 or GW 22. ETs 24 associated with an SCS 28 receive data describing tracking of satellites 12 and relay packets of control information. ETs 24 associated with GWs 22 relay "mission" data packets (e.g., packets relating to SU calls in progress).

SCS 28 desirably monitors the health and status of other system communication nodes (e.g., GWs 22, ETs 24 and satellites 12) and manages operations of communication system 10. GWs 22 desirably perform call processing functions in conjunction with satellites 12 or GWs 22 may exclusively handle call processing and allocation of call handling capacity within communication system 10. One or more ETs 24 provide the primary communications interface between SCS 28, GWs 22, and satellites 12. ET 24 includes antennas and RF transceivers and preferably performs telemetry, tracking and control functions for the constellation of satellites 12.

SUs 26 may be located anywhere on the surface of the Earth or in the atmosphere above the Earth. SUs 26 are preferably communications devices capable of transmitting data to and receiving data from satellites 12. By way of example, SUs 26 may be a hand-held, portable cellular telephones adapted to communicate with satellites 12. Ordinarily, SUs 26 need not perform any control functions for communication system 10. Communication system 10 may accommodate any number, potentially in the millions, of SUs 26.

In a preferred embodiment of the present invention, SU 26 communicates with nearby satellite 12 via subscriber link 16. Link 16 encompasses a limited portion of the electromagnetic spectrum that is divided into numerous channels. Link 16 is preferably a combination of L-Band frequency channels and may encompass Frequency Division Multiple Access (FDMA) and/or Time Division Multiple Access (TDMA) communications or a combination thereof.

A satellite 12 continuously projects one or more broadcast channels 18 toward the surface of the Earth. SU 26 synchronizes to a broadcast channel 18 and monitors broadcast channel 18 to detect data messages which may be addressed to it.

SUs 26 may transmit messages to satellites 12 over one or more acquisition channels 19. Broadcast channels 18 and acquisition channels 19 are not dedicated to any one SU 26 but are shared by all SUs 26 currently within communication range of satellite 12.

Traffic channel 17 is a two-way channel that is desirably used for communication between SU 26 and satellite 12 from time to time. In a preferred embodiment of the present invention, a digital format is used to communicate data over channels 17–19, and traffic channel 17 supports real-time communications. At least one traffic channel 17 is assigned for each call, and each traffic channel 17 desirably has sufficient bandwidth to support a two-way voice conversation.

To support communications over channels 17–19, a TDMA scheme is desirably used to divide time into frames, preferably in the 60–90 millisecond range. A particular traffic channel 17 is assigned particular transmit and receive time-slots, preferably having durations in the 3–10 millisecond range, within each frame. Analog audio signals are digitized so that an entire frame's signal may be transmitted or received in a single, short, high-speed burst during an assigned time-slot. Desirably, each satellite 12 may support a thousand or more traffic channels 17 so that each satellite 12 can simultaneously service a like number of independent calls.

Satellites 12 communicate with other nearby satellites 12 through cross link 23. By utilizing subscriber link 16 and cross links 23, a communication from SU 26 may be routed through the constellation of satellites 12 to within range of any other point on the surface of the Earth that is serviced by communication system 10. The communication may be routed via link 16 to another SU 26 on or near the surface of the Earth from a satellite 12 using subscriber link 16.

Additionally, a communication may be routed down to or up from an ET 24 via link 15. In a preferred embodiment, each satellite 12 may communicate with as many as four ETs 24 and over a thousand subscriber units 26 at any given time.

In general terms, system 10 may be viewed as a network of nodes. Each satellite 12, GW 22, SCS 28, ET 24, and SU 26 represents a node of system 10. All nodes of system 10 are or may be in data communication with other nodes of system 10 through communication links 15, 16, and/or 23. In addition, all nodes of system 10 are or may be in data communication with other telephonic devices dispersed throughout the world through PSTNs and/or conventional terrestrial cellular telephone devices coupled to the PSTN through conventional terrestrial base stations.

In a preferred embodiment, at least one of satellites 12 is desirably within view of almost every point on Earth's surface at all times (i.e., full coverage of the Earth's surface is obtained). Thus, theoretically, any satellite 12 may be in direct or indirect data communication with any SU 26 or ET 24 at any time by routing data through the constellation of satellites 12 via links 23. Accordingly, communication system 10 may establish a communication path, or "route", for relaying data through the constellation of satellites 12 between any two SUs 26, between SCS 28 and GW 22, between any two nodes.

The method and apparatus of the present invention are also applicable to constellations where full coverage of the Earth is not achieved (i.e., where there are "holes" in the communications coverage provided by the constellation) and to constellations where plural coverage of portions of Earth occur (i.e., multiple satellites are in view of areas of the Earth's surface).

With respect to one another, satellite orbits 14 converge and diverge in the polar regions as shown in FIG. 1. Due to this relative movement, the distances between satellites 12 that reside in adjacent orbits 14 vary with the latitudes of the satellites 12. The greatest distance between satellites 12 placed in adjacent orbits 14 exists at the equator. The distance between orbital planes 14 decreases as adjacent-plane satellites 12 approach the polar regions (i.e., the satellites "converge") and increases as adjacent-plane satellites 12 approach the equator (i.e., the satellites "diverge").

Signal Transmission Method

In order to improve signal transmission of the system of SUs 26, SCS 28, GWs 22, ETs 24, and satellites 12, the method of the present invention efficiently minimizes the degree of unused time duration of signal transmissions and flexibly accommodates various degrees of overlapping transmission by determining an optimum number of sub-time slots and determining time shift constraints. Further, the method of the present invention transmits signals of uniform quality by determining an optimum number of sub-subbands and generating desired power ratios.

Figure 2:
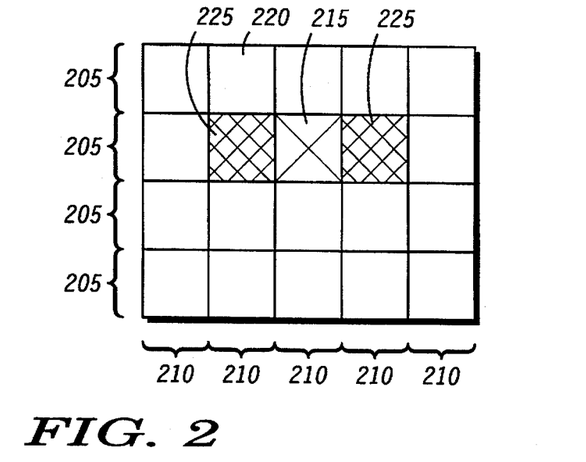
FIG. 2 shows a time and frequency map in a time division multiple access scheme in accordance with a preferred embodiment of the present invention.

FIG. 2 shows a time and frequency map in a time division multiple access scheme in accordance with a preferred embodiment of the present invention. Each subband 205 and time slot 210 combination forms a reuse unit 220.

Reuse unit 215 represents a reuse unit that has been assigned to a user of communication system 10. Assigned reuse unit 215 is occupied by the assigned user's signal transmission for the duration of reuse unit 215 (i.e. the length of time of the relevant time slot associated with the reuse unit). Assigned reuse unit 215 places constraints on the availability of adjacent reuse units 225 because of the possibility of multiple signals residing in the same frequency range and time slot location. Those skilled in the art will appreciate that the possibility for the occurrence of an interference signal may result from the assignment of the same frequency and time slot location to another user due to the realization of frequency subband reuse technology and/or due to system nonlinear operations (e.g., antenna power amplification and frequency conversion) when the signal is transmitting through the system.

When, due to time shift, a signal transmission exceeds the time slot duration and occupies time in an adjacent time slot, prior-art methods simply do not assign the occupied, adjacent time slot. Thus, due to the time shift of the transmission in assigned reuse unit 215, adjacent reuse units 225 would not be used by other users who are located in the cell pattern of neighboring satellites 12 because of a concern with overlapping the times of the adjacent transmissions. The non-use of adjacent reuse units 225 results in inefficient channel assignment and a waste of time potentially available for signal transmission. The method and apparatus of the present invention allows for allocation of adjacent time slots as described below.

The problem of time shift is made worse by the convergence and divergence of satellites 12. As mentioned above in conjunction with FIG. 1, the distances between satellites 12 and SUs 26 vary with the latitudes of the satellites 12. This results in varying degrees of potentially overlapping transmissions. To prevent overlap of signal transmission, prior-art communication systems do not use certain time slots to separate signal transmissions in one time slot from signal transmission in another time slot. As a result, adjacent reuse units 225 are used to separate transmissions and are not used for signal transmission for users served by neighboring satellites.

Figure 3:
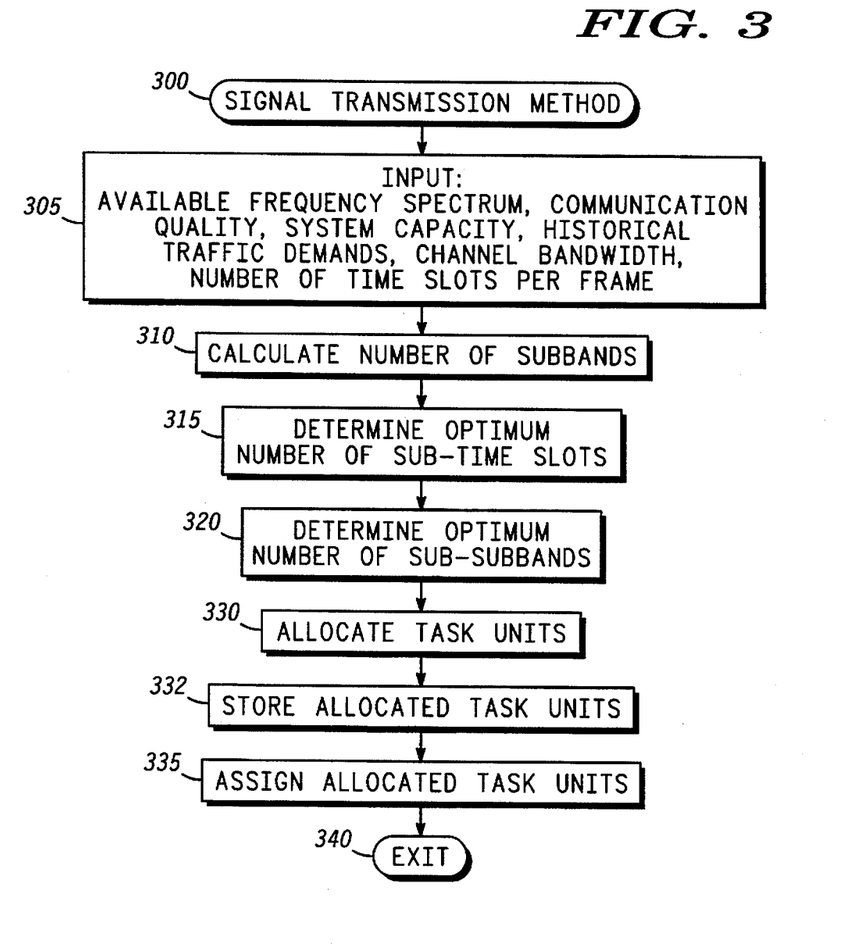
FIG. 3 illustrates a flowchart of a method for improving the signal transmission to establish communications between terrestrial stations and satellites in accordance with a preferred embodiment of the present invention.

FIG. 3 illustrates a flowchart of a method for improving signal transmission to establish communications between terrestrial stations 26 and 24 (FIG. 1) and satellites 12 (FIG. 1) in accordance with a preferred embodiment of the present invention. The method begins in step 300 by inputting in step 305 data describing available frequency spectrum, statistical system performance (e.g. communication quality, system capacity and historical traffic demands), channel bandwidth, and number of time slots. The channel bandwidth is desirably based on providing a bandwidth sufficient to support a two-way voice conversation, for example. The number of time slots is desirably based on system requirements (e.g., rate of transmission and synchronization character of the transmission).

A number of subbands is calculated in step 310 based on the available frequency spectrum and the channel bandwidth. In a preferred embodiment, the frequency spectrum is separated into multiple channels having a predetermined bandwidth. Each subband contains a predetermined number of channels. By dividing the total number of channels by the predetermined number of channels, a number of subbands in the available frequency spectrum is determined, for example. Additionally, in a preferred embodiment, the time axis is separated into time frames based on a transmission time of a unit of information. The transmission time may depend on the rate of transmission and synchronization character of the circuits used to implement the transmission of information.

Step 315 determines an optimum number of "sub-time slots" based on the statistical system performance data. A sub-time slot is desirably a sub-division of a time slot duration. The optimum number of sub-time slots may depend on the historical character of time shift based on each satellite's relation to other satellites with overlapping signal transmission. Loss of the use of whole time slots occupied by time-shifted signal transmission resulting from using prior-art methods is reduced by a preferred embodiment of the method and apparatus of the present invention. In a preferred embodiment, the optimum number of sub-time slots accommodates the varying degrees of overlap and optimizes the duration of the sub-time slots to ensure the best and uniform quality of signal transmission. For example, time shifts (e.g., time delays of signal transmissions or overlapping transmissions) are compared with the system requirements (e.g., time slots or reuse unit duration) for signal transmission. A duration of time (e.g., sub-time slot duration) is selected, and an optimum number of sub-time slots is determined based on the selected duration and the system requirements.

Step 320 determines an optimum number of "sub-subbands" based on the statistical system performance data. A sub-subband is desirably a sub-division of a subband bandwidth. The optimum number of sub-subbands may depend on the historical communication traffic demand and its associated statistical measured data relating to the desired signal and interfering signal power levels. For example, historical system traffic demand is compared to the system performance data (e.g., subband width). A range of frequency (e.g., sub-subband) is desirably selected, and an optimum number of sub-subbands is determined based on the selected range and the system performance data.

Task units are allocated in step 330, where a "task unit" is defined herein to be a combination of a sub-time slot and a sub-subband. Prior to allocation, task units are created by establishing a matrix having dimensions of sub-time slots and sub-subbands. Dividing the optimum number of sub-time slots into the historical length of a time slot determines the length of time per sub-time slot, and dividing the optimum number of sub-subbands into the historical width of a subband determines the range of frequency per sub-subband, for example. Each task unit in the matrix is capable of holding a signal for transmission in an FDMA system, TDMA system, or a combination thereof. A method of allocating task units in accordance with a preferred embodiment is further discussed in FIG. 6. The allocated task units optionally may then be stored in step 332.

Allocated task units are assigned to users in step 335 when users ask for assignment.

In a preferred embodiment, previously allocated (step 330) and stored (step 332) task units are transmitted in step 335 to satellites in order that communication traffic may be controlled through selective assignment by the satellites of allocated task units to users. In an alternate embodiment, the steps illustrated in FIG. 3 (or a suitable subset or the equivalent thereof) may be carried out in satellites (e.g., satellites 12, FIG. 1). Steps 315–335 result in controlling communication traffic between satellites 12 and terrestrial stations. The procedure then exits in step 340.

It will be appreciated that steps 315 and 320 outlined hereinabove need not necessarily be carried out in the order represented here. For example, determining an optimum number of sub-time slots (step 315) may occur after determining an optimum number of sub-subbands (step 320).

Figure 4:
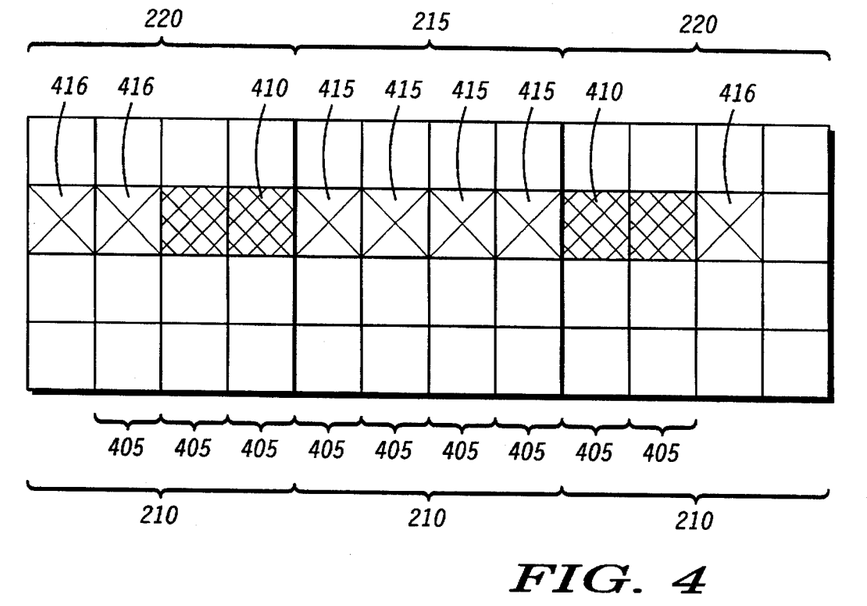
FIG. 4 shows an enlarged view of an assigned reuse unit and adjacent reuse units in a time division multiple access scheme in accordance with a preferred embodiment of the present invention.

The method and apparatus of the present invention can be used for either TDMA or FDMA systems or a combination thereof. FIG. 4 shows a preferred embodiment of the present invention in a TDMA system and FIG. 5 shows a preferred embodiment of the present invention in an FDMA system.

FIG. 4 shows an enlarged view of assigned reuse unit 215 (e.g., reuse unit 215, FIG. 2) and adjacent reuse units 220 (e.g., reuse unit 220, FIG. 2) in a TDMA scheme in accordance with a preferred embodiment of the present invention. Each time slot 210 is divided into sub-time slots 405 based on the determined optimum number of sub-time slots (see description of FIG. 3, step 315). Unavailable sub-time slots 410 separate the assigned time slots 415 and 416.

The time slot division method of a preferred embodiment of the present invention provides significant advantages. Specifically, it provides for efficient use of time slots by allowing for signal transmission in sub-time slots that normally would not be used for signal transmission. For example, if a signal transmission's time shift occupied half of the duration of a time slot 210, prior art methods would not use the remaining unoccupied half of the time slot 210 and further, the prior-art methods would not use the entire duration of adjacent reuse units 220 (FIG. 2). After division into sub-time slots in accordance with the method of the present invention, the unoccupied sub-time slots 416 may be used for signal transmission. Thus, the time slot division method of a preferred embodiment of the present invention minimizes the degree of unused time duration of signal transmissions by determining an optimum number of sub-time slots (step 315, FIG. 3) that creates unoccupied sub-time slots 416 for additional signal transmission. The method and apparatus of the present invention also flexibly and dynamically accommodate various degrees of potentially overlapping transmission due to varying satellite latitudes by determining an optimum number of sub-subbands (step 315, FIG. 3) and allocating task units (step 330, FIG. 3).

Figure 5:
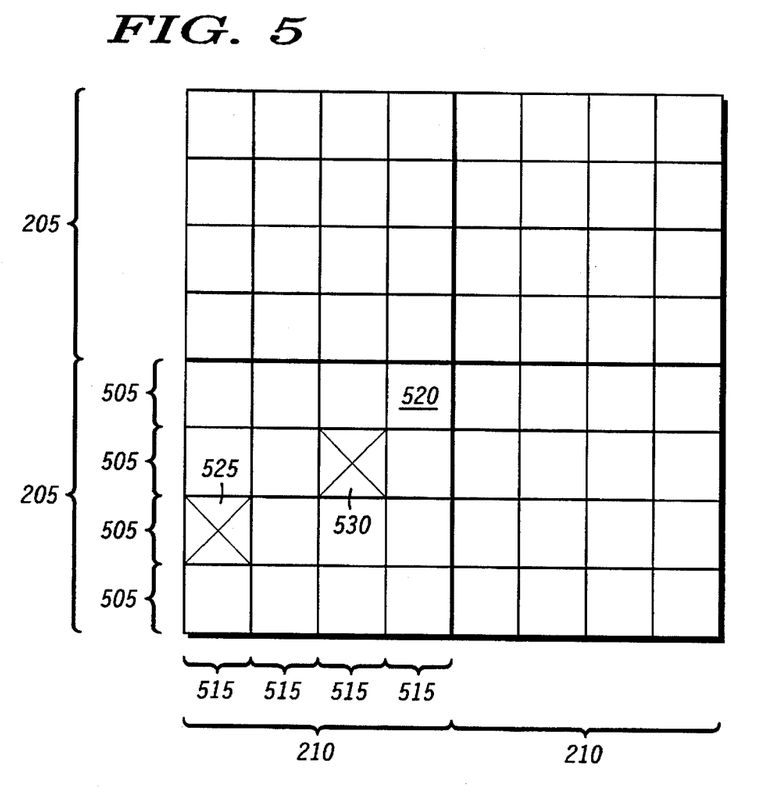
FIG. 5 shows an enlarged view of an assigned reuse unit in a frequency division multiple access and time division multiple access combination scheme in accordance with a preferred embodiment of the present invention.

FIG. 5 shows an enlarged view of an assigned reuse unit in an FDMA scheme in accordance with a preferred embodiment of the present invention. The subband 205 (e.g., subband 205, FIG. 2) is divided into sub-subbands 505 based on the determined optimum number of sub-subbands (see description of FIG. 3, step 320). The time slot 210 (e.g., time slot 210, FIG. 2) is divided into sub-time slots 515 (see description of FIG. 3, step 315). Each sub-subband 505 and sub-time slot 515 combination forms a task unit 520.

In a preferred embodiment, allocation of task units 520 depends on data describing historical traffic, predicted interference among channels, and the total number of sub-time slots and sub-subbands. Historical traffic data may include, for example, signal transmission characteristics such as power spectral density and degree of time shift. Interference data includes, for example, various signal power spectral densities.

The quality of a transmission depends on providing a uniform level of communication quality. The subband division method of a preferred embodiment of the present invention provide such a uniform level of communication quality as follows. Those skilled in the art will appreciate that a signal to interference power ratio indicates the quality and the potential for error of the transmitted signal. The optimum power ratio is desirably based on statistical information describing desired signal and interference signal power levels.

In a preferred embodiment, signal allocation in a particular sub-subband is based on the generation of an optimum desired signal to interference signal power ratio in the sub-subband. A desired signal power spectral density is desirably compared with an interference signal power spectral density. In a preferred embodiment, a desired signal may be allocated in the sub-subband 525 while the associated interfering signal may occupy the sub-subband 530.

In an alternate embodiment, the optimum power ratio is based on the generation of a uniform desired signal and interference signal power ratio over a range of sub-subbands. Generation of a uniform power ratio over a range of sub-subbands desirably compares historical traffic data in each sub-subband and groups the sub-subbands according to similar power spectral densities, for example. The method and apparatus of the present invention provide uniform signal transmission by determining an optimum number of sub-subbands (step 320, FIG. 3) and allocating task units (step 330, FIG. 3). Thus, the method and apparatus of the present invention provide uniform signal transmission throughout a user's access to the communication system.

Figure 6:
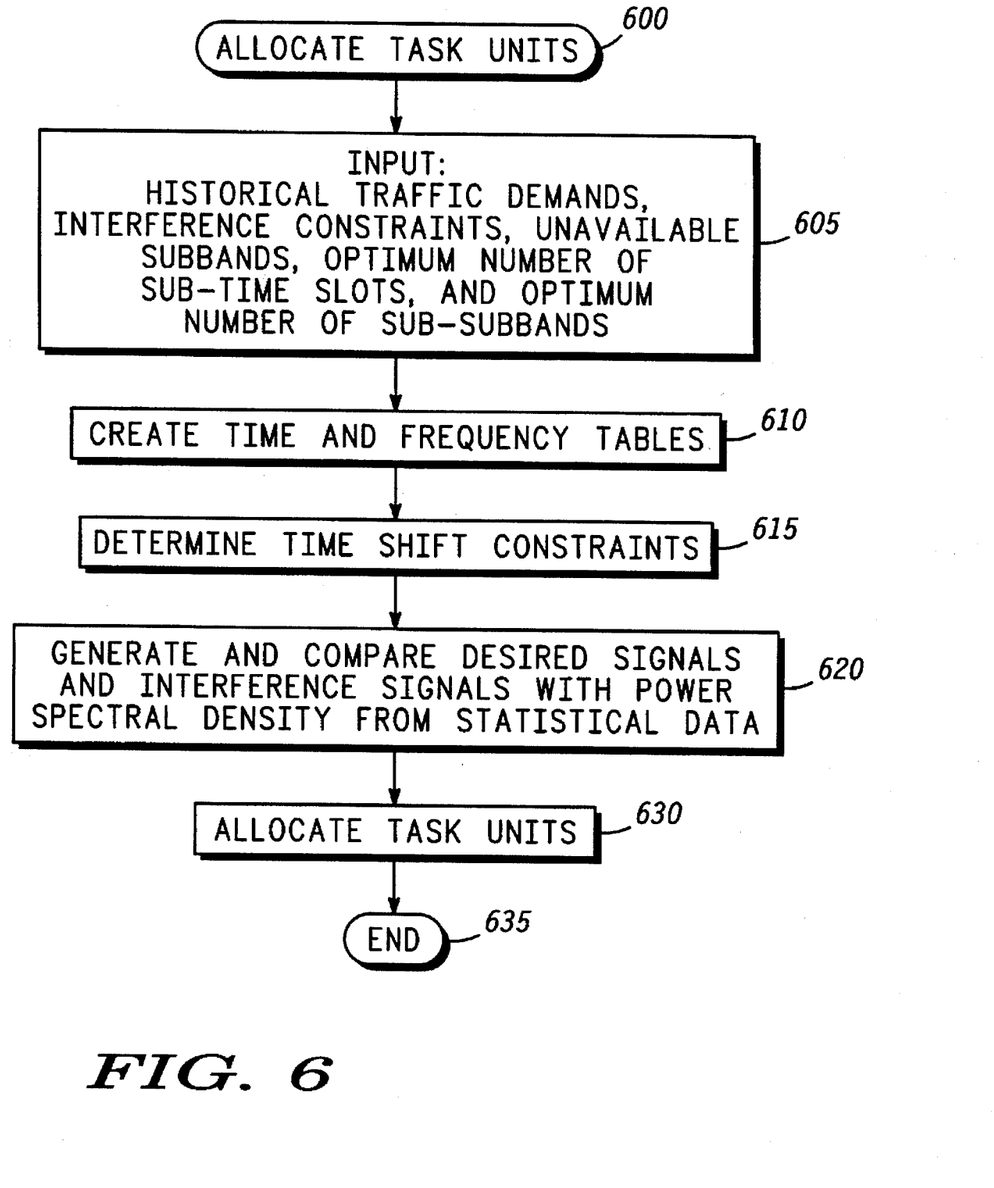
FIG. 6 illustrates a flowchart of a method to allocate task units in accordance with a preferred embodiment of the present invention.

FIG. 6 illustrates a flowchart of a method to allocate task units in accordance with a preferred embodiment of the present invention and as described in step 330 of FIG. 3. The method begins in step 600 by inputting in step 605 the optimum number of sub-time slots, the optimum number of sub-subbands, data describing historical traffic demands and possible constraints among channels (e.g., interference and subbands unavailable to certain channels).

Time and frequency tables based on time and frequency maps of sub-time slot and sub-subband divisions are created in step 610. In a preferred embodiment, these tables include information describing historical characteristics of transmitted signals (e.g., power spectral densities and degrees of time shift) and interference constraints correlating to the transmitted signals. The historical traffic demands are determined, for example, from the demand for each channel during the past twenty-four hours.

The time shift constraints for signal transmission are determined in step 615. In a preferred embodiment, time shift constraints are based on historical information describing degrees of time shift for each reuse unit and/or task unit. For example, the time shift constraint includes time delays for each signal transmission that exceeds a predetermined time slot duration.

Desired signal and interference signal power spectral densities are generated and compared in step 620. In a preferred embodiment, an optimum desired signal and interference signal power ratio is generated by comparing the power spectral densities of historical reuse units (e.g., desired signals) and/or task units with the power spectral densities of interference signals.

A desired signal is allocated a certain task unit in step 630 based on the time shift constraints and the statistical power spectral densities of desired and interfering signals. The procedure then exits in step 635.

The method and apparatus of the present invention address the desire to prevent overlap of transmissions in the time domain by determining the time delay for each historical signal transmission and designating available sub-time slots to accommodate the time delay. Additionally, the method and apparatus address the desire to generate uniform signal transmission in the frequency domain by selecting desired power ratios based on the desired signals and interference signals and by designating sub-subbands having signal transmission that conform to the desired power ratios.

It will be appreciated that steps 610, 615, and 620 outlined hereinabove need not necessarily be carried out in the order represented here. For example, the time shift constraints may be determined (step 615) before the time and frequency tables are created (step 610). In a preferred embodiment, the procedure illustrated in FIG. 6 is carried out in one or more terrestrial stations (e.g., GW 22, SCS 28, FIG. 1).

Communication Traffic Control Apparatus

Figure 7:
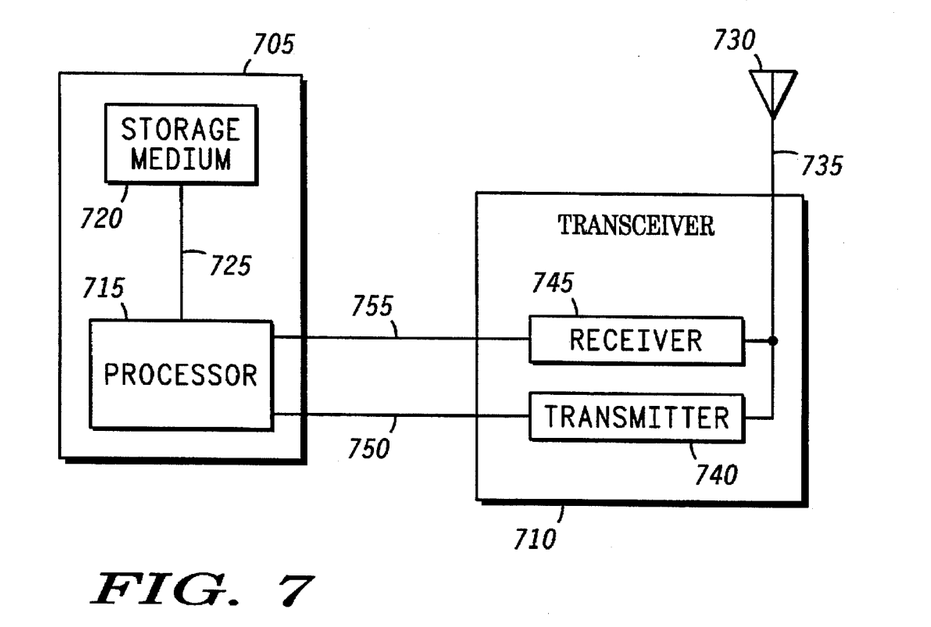
FIG. 7 is a simplified schematic diagram of portions of a terrestrial station in accordance with a preferred embodiment of the present invention.

FIG. 7 is a simplified schematic diagram of portions of a terrestrial station (e.g., GW 22, SCS 28, FIG. 1) in accordance with a preferred embodiment of the present invention. Portion 705 includes processor 715 coupled to storage medium 720 (e.g., random access memory, other semiconductor or magnetic read-write memory devices, optical disk, magnetic tape, floppy disk, hard disk) via link 725.

In a preferred embodiment, processor 715 carries out procedures exemplified in FIGS. 3, 6, and associated text. Processor 715 also desirably performs other tasks as described herein and stores results from such procedures in storage medium 720, for example.

Transceiver 710 includes transmitter 740 and receiver 745 coupled to processor 715 via links 750 and 755, respectively. In a preferred embodiment, transceiver 710 corresponds to an ET 24 (FIG. 1). Using antenna 730, transmitter 740 and/or receiver 745 transmit allocated task units to and/or receive assigned task units from satellites in accordance with a preferred embodiment of the present invention. Antenna(e) 730 is coupled to transceiver 710 via link 735.

Figure 8:
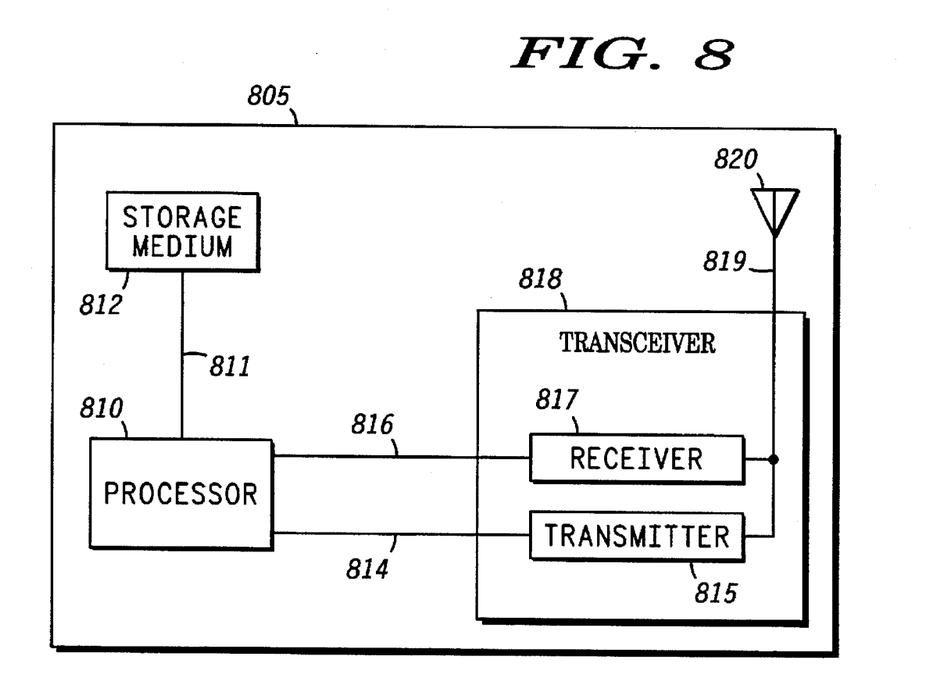
FIG. 8 is a simplified schematic diagram of a portion of a satellite in accordance with a preferred embodiment of the present invention.

FIG. 8 is a simplified schematic diagram of a portion 805 of a satellite 12 in accordance with a preferred embodiment of the present invention. Portion 805 desirably includes processor 810 coupled to storage medium 812 (e.g., random access memory, other semiconductor or magnetic read-write memory devices, optical disk, magnetic tape, floppy disk, hard disk) via link 811.

Transceiver 818 comprises transmitter 815 and receiver 817 coupled to processor 810 via links 814 and 816, respectively. Receiver 817 receives messages transmitted by terrestrial stations (e.g., ET 24, SCS 28, FIG. 1) and/or from other satellites (e.g., satellites 12, FIG. 1) which are processed by processor 810. Antenna(e) 820 is coupled to transceiver 818 via link 819.

In a preferred embodiment, received messages include allocated task units calculated by processor 715 (FIG. 7) in accordance with procedures exemplified in FIGS. 3, 6, and associated text. Task units are desirably stored in storage medium 812. In a preferred embodiment, allocated task units are desirably used for real time channel assignment when a user enters the system as exemplified in FIG. 3, step 335.

In an alternative embodiment, the procedures exemplified in FIGS. 3, 6, and associated text are carried out by processor 810, calculating information on available task units directly within the satellite. For example, by allocating task units within a satellite, the satellite itself may then control the communication traffic by assigning the allocated task units during real time.

The method and apparatus of the present invention maximize channel assignment by efficiently minimizing the degree of unused time duration of signal transmissions in a communication system. The method and apparatus of the present invention also flexibly and dynamically accommodate various degrees of potentially overlapping transmission due to varying satellite locations. In addition, the method and apparatus of the present invention provide uniform signal transmission during a user's access to the communication system.

The foregoing description of the specific embodiments will so fully reveal the general nature of the invention that others can, by applying current knowledge, readily modify and/or adapt for various applications such specific embodiments without departing from the generic concept and, therefore, such adaptations and modifications should and are intended to be comprehended within the meaning and range of equivalents of the disclosed embodiments.

It is to be understood that the phraseology or terminology employed herein is for the purpose of description and not of limitation. Accordingly, the invention is intended to embrace all such alternatives, modifications, equivalents and variations as fall within the spirit and broad scope of the appended claims.

What is claimed is:

1. A method for controlling signal transmissions for a communication system, said method comprising the steps of:

creating task units from a number of sub-time slots and a number of sub-subbands, wherein each of the sub-time slots defines a range of time, each of the sub-subbands defines a range of frequencies, and a task unit is defined by a combination of a sub-time slot with a sub-subband, the task unit for conveying a signal transmission;

determining time shift constraints for each of the task units based on historical time delays of the signal transmissions;

generating desired power ratios by comparing desired signal strengths with historical interference signal strengths in the communication system;

allocating the task units by situating the signal transmissions in the task units corresponding to the time shift constraints and the desired power ratios resulting in allocated task units;

assigning the allocated task units through communication devices to users of the communication system by comparing time delays and signal strengths of the signal transmission with the time shift constraints and the desired power ratios of the allocated task units resulting in assigned task units; and sending the assigned task units to the users of the communication system through the communication devices to control the signal transmissions.

2. The method as claimed in claim 1, further comprising the steps of:

receiving system performance data describing an available frequency spectrum, a channel bandwidth, a predetermined range of time, the historical time delays of signal transmissions, the desired signal strengths, and the historical interference signal strengths; and storing the allocated task units in a storage medium for assignment.

3. The method as claimed in claim 1, wherein the step of determining the time shift constraints comprises the step of determining a time delay for each of the signal transmissions that exceed a predetermined range of time.

4. The method as claimed in claim 1, wherein the step of generating the desired power ratios further comprises the steps of:

comparing power spectral densities of the desired signal strengths with power spectral densities of the historical interference signal strengths obtained from historical system data and historical interference constraints of the communication system; and selecting the desired power ratios based on the power spectral densities of the desired signal strengths and the historical interference signal strengths to reduce an interference signal effect on the signal transmission.

5. The method as claimed in claim 1, wherein the step of allocating the task units comprises the steps of:

designating an availability of the sub-time slots to accommodate a time delay for the signal transmission that exceeds a predetermined time;

designating the sub-subbands that conform to the desired power ratios; and allocating the signal transmission to task units based on the availability of the sub-time slots and the sub-subbands that conform to the desired power ratios.

6. The method as claimed in claim 1, wherein the step of creating the task units comprises the steps of:

selecting a duration of time based on a comparison of time delays of the signal transmissions with system performance data describing requirements for the signal transmissions;

determining the number of the sub-time slots based on a division of the duration into a predetermined signal transmission time;

selecting a range of frequencies based on a comparison of historical system demand with the system performance data; and determining the number of the sub-subbands based on a division of the range into a predetermined frequency range.

7. In a system comprising a control station, a terrestrial station, multiple subscriber units, and a satellite, the control station including a first computer, the terrestrial station coupled to the control station including a first transmitter and a first receiver, the satellite including a second computer, a first storage medium coupled to the second computer, a second transmitter and a second receiver each coupled to the second computer, a method for controlling signal transmissions between the terrestrial station and the satellite, said method comprising the steps of:

receiving, by the control station, system data describing historical traffic demand and interference constraints;

determining a number of sub-time slots and a number of sub-subbands by the first computer, each of the sub-time slots defining a range of time, and each of the sub-subbands defining a range of frequencies;

creating task units by the first computer by combining the number of the sub-time slots with the number of the sub-subbands, wherein a task unit defines a combination of a sub-time slot with a sub-subband for conveying a signal transmission;

allocating the task units by the first computer by situating the signal transmission in the task units to accommodate historical time delays, desired power ratios, and the interference constraints resulting in allocated task units;

sending the allocated task units by the first transmitter to the second receiver;

assigning the allocated task units to the terrestrial station by the second computer resulting in assigned task units; and controlling the signal transmissions by the second transmitter by designating a subscriber unit transmission to an assigned task unit.

8. The method as claimed in claim 7, further comprising the step of storing the allocated task units in the first storage medium.

9. The method as claimed in claim 7, wherein the step of determining the number of the sub-time slots and the number of the sub-subbands comprises the steps of:

determining time shift constraints by calculating time delays of historical signal transmissions;

selecting a duration of time to accommodate the time shift constraints and the system data;

calculating the number of the sub-time slots by dividing the duration of time into a predetermined range of time;

determining frequency constraints by comparing historical communication demands with statistical measured data describing power spectral densities of the system;

selecting a range of frequencies to accommodate the frequency constraints and the system data; and calculating the number of the sub-subbands by dividing the range of frequencies into a predetermined range of frequencies.

10. The method as claimed in claim 7, wherein the step of allocating the task units comprises the steps of:

determining a time delay of the signal transmission;

comparing power spectral densities of the signal transmission with power spectral densities of historical interference signals from the system data; and allocating the signal transmission based on the step of comparing the power spectral densities and the time delay.

11. The method as claimed in claim 7, wherein the step of assigning the allocated task units comprises the steps of:

receiving a request for a subscriber unit assignment by the second receiver from the first transmitter; and assigning the allocated task units based on the request.

12. A method for controlling signal transmissions between a terrestrial station and a satellite, said method comprising steps of:

obtaining, by the terrestrial station, subbands, time slots, and historical communication traffic data describing signal strengths and interference signal strengths of the subbands, signal transmission time delays of the time slots, and transmission performance requirements, the subband defining a range of frequencies, the time slot defining a range of time;

creating a communication structure having task units by correlating the subbands with the time slots and by accommodating the transmission performance requirements and the signal transmission time delays, wherein a task unit defines a location in the subbands and a location in the time slots for carrying the signal transmission;

allocating the signal transmissions to the task units resulting in allocated task units by comparing the task units with the signal strengths, the interference signal strengths, and the signal transmission time delays;

assigning the allocated task units to subscriber units resulting in assigned task units; and dynamically controlling communication traffic between the satellite and the terrestrial station using the assigned task units to provide access to the subscriber units.

13. The method as claimed in claim 12, wherein allocating the task units comprises the steps of:

generating subband characteristics of the signal strengths and the interference signal strengths by comparing power spectral densities of historical signals with power spectral densities of historical interference signals in the subbands;

determining time shift constraints of the signal transmissions by comparing the signal transmission time delays;

designating the range of frequencies for the signal transmissions that conform to the subband characteristics;

designating the range of time for the signal transmissions that accommodate the time shift constraints; and allocating the signal transmissions to the range of frequencies and the range of time.

14. The method as claimed in claim 12, further comprising the steps of:

storing the allocated task units in a storage medium; and sending the allocated task units to the satellite.

15. A method for controlling signal transmissions for a communication system comprising subscriber units, said method comprising the steps of:

creating task units from a number of sub-time slots and a number of sub-subbands, wherein a sub-time slot defines a range of time, a sub-subband defines a range of frequencies, and a task unit defines a combination of the sub-time slot with the sub-subband for conveying the signal transmissions;

determining time delays for each of the signal transmissions that exceed a predetermined time;

determining time shift constraints based on the time delays of the signal transmissions for each of the task units;

allocating the task units by situating the signal transmissions within the task units to accommodate the time shift constraints resulting in allocated task units;

assigning the allocated task units to the subscriber units by comparing historical subscriber unit transmissions with the time shift constraints resulting in assigned task units; and sending the assigned task units to subscriber units to control the signal transmissions.

16. The method as claimed in claim 15, wherein the step of allocating the task units comprises the steps of:

designating an availability of the sub-time slots to accommodate the time delays that exceed the predetermined time; and allocating the signal transmissions to the task units based on the availability of the sub-time slots.

17. The method as claimed in claim 15, wherein the step of creating the task units comprises the steps of:

comparing the time delays of the signal transmissions with system performance data describing requirements for the signal transmissions;

selecting a duration of time based on the step of comparing the time delays with the system performance data; and determining the number of the sub-time slots based on the duration and a predetermined signal transmission time.

18. A method for controlling signal transmissions in a communication system, said method comprising the steps of:

creating task units from a number of sub-time slots and a number of sub-subbands, wherein a sub-time slot defines a range of time, a sub-subband defines a range of frequencies, and a task unit defines a combination of the sub-time slot with the sub-subband for holding the signal transmissions;

comparing power spectral densities of historical desired signals with power spectral densities of historical interference signals of the communication system;

generating desired power ratios by selecting the power spectral densities of the historical desired signals and the power spectral densities of the historical interference signals to reduce an effect of interference signals on the signal transmissions;

allocating the task units by situating the signal transmissions in the task units corresponding to the desired power ratios resulting in allocated task units;

assigning the allocated task units to subscriber units by comparing historical user signal transmissions with the desired power ratios resulting in assigned task units; and sending the assigned task units to subscriber units to control the signal transmissions.

19. The method as claimed in claim 18, wherein the step of allocating the task units comprises the steps of:

designating the sub-subbands as having the signal transmissions that conform to the desired power ratios resulting in designated sub-subbands; and allocating the signal transmissions to the task units based on the designated sub-subbands.

20. The method as claimed in claim 18, wherein the step of creating the task units comprises the steps of:

comparing historical system data describing subscriber unit demands with system performance data;

selecting the range of frequencies based on the step of comparing the historical system data with the system performance data; and determining the number of the sub-subbands based on the range and a predetermined frequency range.

\* \* \* \* \*